Nov. 11, 1958  R. A. WILLIAMS  2,860,215
ADJUSTABLE RESISTANCE DEVICE
Filed March 20, 1956  4 Sheets-Sheet 1

INVENTOR
ROBERT A. WILLIAMS
BY Cushman, Darby & Cushman
ATTORNEYS

Nov. 11, 1958 — R. A. WILLIAMS — 2,860,215
ADJUSTABLE RESISTANCE DEVICE
Filed March 20, 1956 — 4 Sheets-Sheet 2
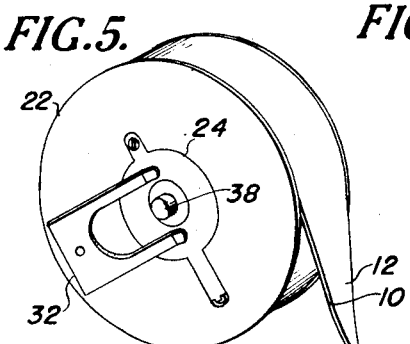
FIG.5.
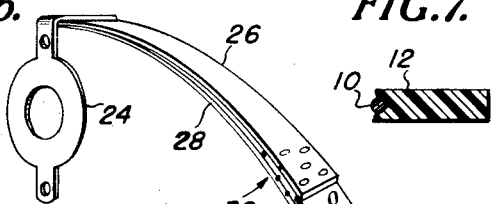
FIG.6.
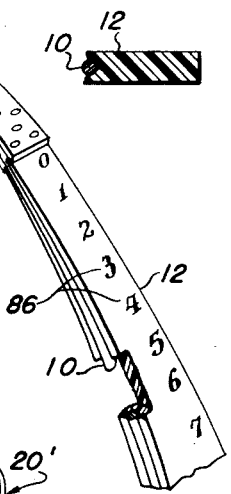
FIG.7.
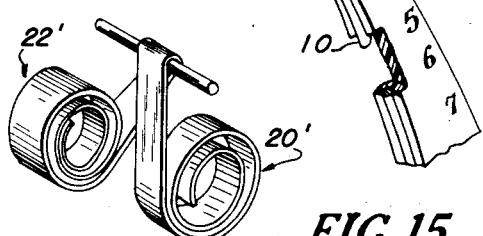
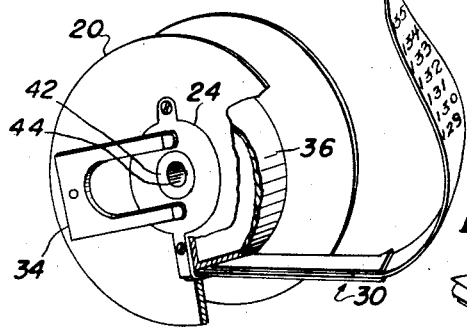
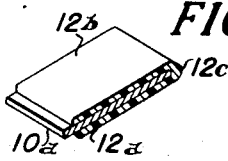
FIG.8.
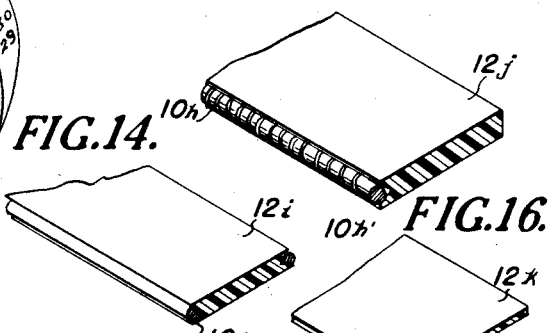
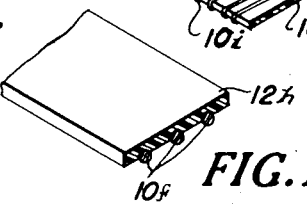
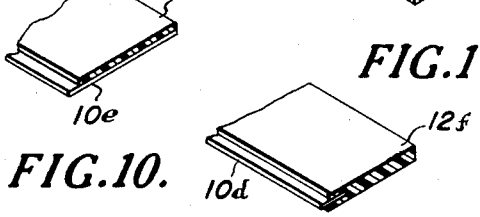
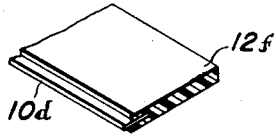
INVENTOR
ROBERT A. WILLIAMS
BY Cushman, Darby & Cushman
ATTORNEYS Nov. 11, 1958   R. A. WILLIAMS   2,860,215
ADJUSTABLE RESISTANCE DEVICE
Filed March 20, 1956   4 Sheets-Sheet 3

INVENTOR
ROBERT A. WILLIAMS

BY
Cushman, Darby & Cushman
ATTORNEYS

Nov. 11, 1958 R. A. WILLIAMS 2,860,215
ADJUSTABLE RESISTANCE DEVICE
Filed March 20, 1956 4 Sheets-Sheet 4

INVENTOR
*Robert A. Williams*

BY *Cushman, Darby & Cushman*
ATTORNEYS

United States Patent Office 2,860,215
Patented Nov. 11, 1958

2,860,215

ADJUSTABLE RESISTANCE DEVICE

Robert A. Williams, Fort Worth, Tex., assignor to B & H Instrument Company, Inc., Fort Worth, Tex., a corporation of Texas Application March 20, 1956, Serial No. 572,758

28 Claims. (Cl. 201—59)

This invention relates to adjustable resistance devices and particularly to devices of this type known as slide wire potentiometers.

This application is a continuation-in-part of my copending application Serial No. 501,697, filed April 15, 1955, now abandoned.

While there has been a considerable development of adjustable resistance devices which cover an extensive range of resistance values, the elongated resistance elements usually found in these devices are invariably non-linear in resistance characteristics. That is, it is found that the devices cannot be simply calibrated in terms of a measurement of the length of the resistance element, because variations in resistivity occur. There may be portions of the length of the resistive element which are of greater or lesser diameter than an intended uniform diameter. Additionally, the physical structure of the resistance element may itself change from point to point along the length thereof with the net result that a measurement at any given point along the resistive element may vary from a calculated value by a value which renders the use of the device impractical. A primary use of devices of the character described are for potentiometer circuits, where very accurate resistance values must be measured when a galvanometer movement or the like is centered.

The present invention overcomes the non-linear characteristics of resistance elements as discussed above basically by providing a member upon which may be placed indicia for giving information of resistance values from point to point along the elongated resistive element. Means are provided for continuously relating the position of a contact means in engagement with the resistive element, with the position of the indicia carrying member relative to some convenient locator means. The latter may be a pointer or the like. At some point in the manufacture of the device, even after it is finally assembled, the resistive element and the indicia carrying member may be moved step by step and at each step a resistance reading may be actually taken, and indicia representing the actual recorded value may be placed on the member. Thereafter, positioning of a particular indicia at the locator means provides the correct resistance reading without question. The invention in fact includes a length of resistive material, such as a broad tape, upon which the indicia may be placed according to values of resistance actually measured electrically at the point, or a point related to, the place of appearance of the indicia.

The invention may take many forms and no limitation to any particular form is intended. Illustrative embodiments of the invention will be described in detail hereinbelow.

It is a primary object of this invention to provide an adjustable resistance device free of errors due to non-linearity of the resistive element.

It is a further object of this invention to provide such a device wherein indicia representing actual measured resistance values are moved synchronously with the resistive element so that a setting of the instrument with regard to the indicia gives the actual measured value of the resistance directly.

Further objects of this invention are to provide an elongated resistive element fixed to an elongated indicia carrying member in a variety of ways, to maintain the relationship between indicia and resistive values along the resistive element.

A further object of this invention is to provide a device as described above in a compact instrument casing.

It is a further object of this invention to provide a mechanism for reeling an elongated resistive element between two reels while maintaining tension on the element.

It is a further object of this invention to provide means for correlating a conventional potentiometer with an indicia carrying member so as to relate the indicia to progressive resistance values of the conventional adjustable resistance device.

Further objects of the invention will become apparent from the following detailed description and from the appended claims.

Illustrative embodiments of the invention may be best understood with reference to the accompanying drawings, wherein:

Figure 5 shows a fragmentary view of components of the structure of Figures 1–4.

Figure 6 shows a further fragmentary view of components of the structure of Figures 1–4.

Figure 7 shows a cross-sectional view of a resistive element and an indicia carrying member shown in Figure 6.

Figure 8 shows a fragmentary view of a modified form of resistive element and indicia carrying member according to the invention.

Figure 9 shows a further embodiment of a resistive element and indicia carrying member according to the invention.

Figure 10 shows a further view of a resistive element and indicia carrying member according to the invention.

Figure 11 shows a further view of a resistive element and indicia carrying member according to the invention.

Figure 12 shows a further view of a resistive element and indicia carrying member according to the invention.

Figure 13 shows a further view of a resistive element and indicia carrying member according to the invention.

Figure 14 shows a further view of a resistive element and indicia carrying member according to the invention.

Figure 15 shows a further view of a resistive element and indicia carrying member according to the invention.

Figure 16 shows a further view of a resistive element and indicia carrying member according to the invention.

Figure 17 shows diagrammatically an arrangement for placing reels side by side for reeling therebetween a resistive element and indicia carrying member according to the invention.

Figure 1:
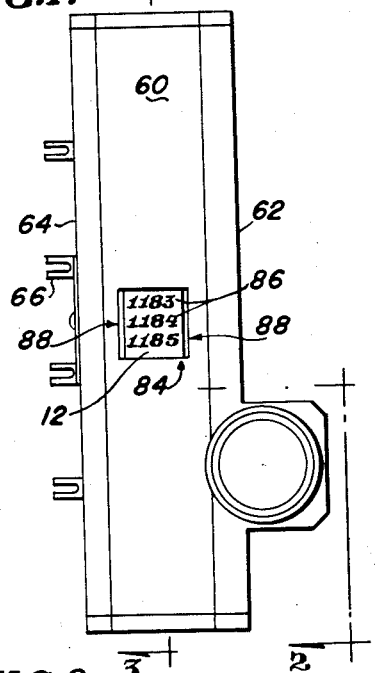
Figure 1 shows a side elevational view of an embodiment of the invention.

The general principles of the invention as well as a preferred specific embodiment thereof may be best understood with reference to Figures 1–7 inclusive wherein like members are designated by like reference characters. An elongated electrical resistance element 10 is fixed as by bonding by any suitable cement or the like to an indicia carrying member 12. The member 12 is preferably of suitable paper or plastic stock substantial enough to carry the element 10 and yet be of minimum thickness to permit reeling up a considerable length thereof without undue bulk. Preferably, the indicia carrying member 12 is of electrical insulating material so that the resistance element 10 is in no way short-circuited along its length. However, element 10 may carry insulation and member 12 may be conductive, so long as some portion of the exposed part of resistance element 10 is free of insulating covering so as to make possible a contact with contacting device 14 (Fig. 5) having contact points 16 and 18. The indicia carrying member 12 may be constructed of any convenient material.

For purpose of example, without limitation thereto, a suitable material for the indicia carrying member 12 is laminated white bond paper, impregnated with phenolic resin. The cement used for affixing the circular insulated resistive element to the groove in one side of member 12 may be synthetic rubber base cement that remains flexible at temperatures as low as 100° F. and is not appreciably softened at 250° F., has high bond strength and is resistant to aliphatic and aromatic hydrocarbons.

As shown in Figures 6 and 7, the resistance element 10 could be a wire having an enamel cover except this would be removed at the outermost side away from the member 12 so as to permit contact points such as 16 and 18 to be in electrical contact with the element.

A reel 20 and another reel 22 are provided for the transfer of the combined element 10 and member 12 therebetween in a manner which will be further described. Each reel may be provided with a brush and holder device 24 (Fig. 6) having attached thereto flexible leaves 26 and 28 between the ends of which the free ends of the member 12 may be clamped, as at 30. The devices 24 also serve as contact segments for brush devices 32 and 34 by which electrical connection can be made via the leaves 26 and 28, which are electrically conductive, to the resistive element 10. For this purpose the junction point 30 should comprise suitable means such as soldering or the like to insure good electrical connection. An electrical connection is preferably made via the brushes 32 and 34 to both ends of the elongated resistance element 10, inasmuch as connections to both ends are preferable in many applications of devices of the type being described.

Figure 2:
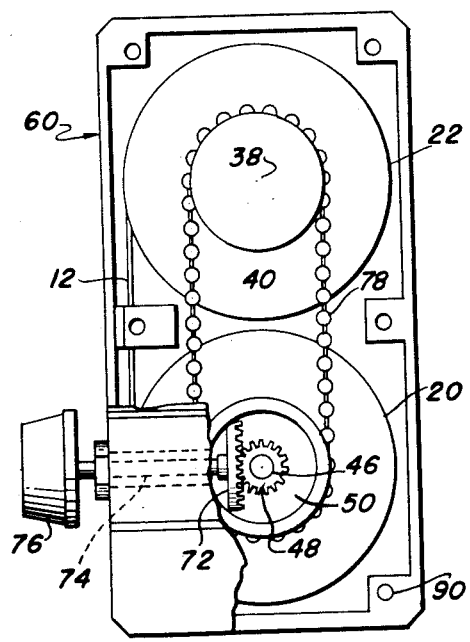
Figure 2 shows a front elevational view of the embodiment of Figure 1 with the top cover substantially removed along the line 2—2 of Figure 1.
Figure 3:
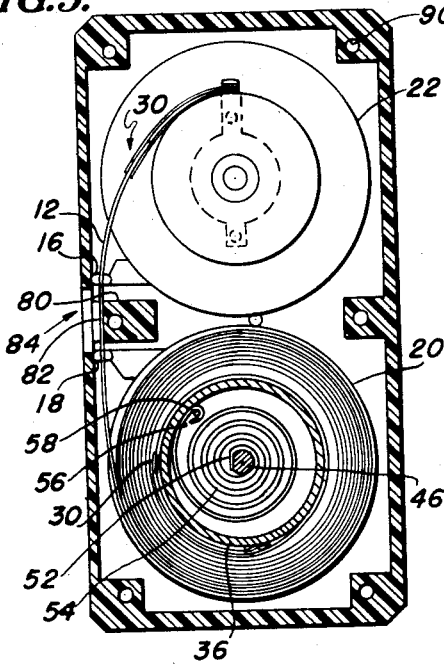
Figure 3 shows a cross-sectional view taken substantially along the line 3—3 of Figure 1.
Figure 4:
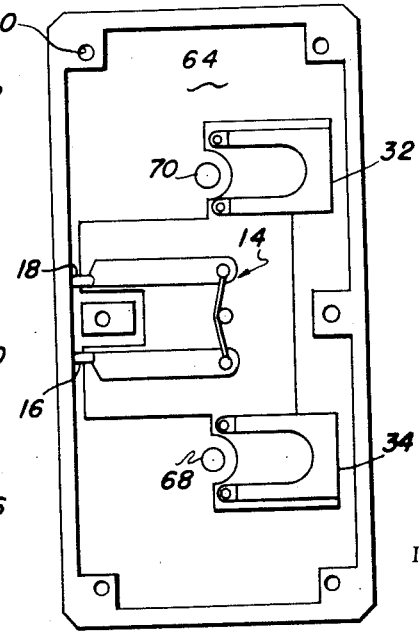
Figure 4 shows a plan view of the bottom cover of the embodiment of Figure 1.

Each of the reels 20 and 22 may be provided with a hub 36 (Figs. 3 and 5) about which the member 12 will reel. Reel 22 is further characterized by a central axle 38 to which there is fixed a sprocket 40 (Fig. 2). Reel 20 is provided centrally thereof with a bearing 42 defining an aperture 44 through which may be passed an axle 46 (Figs. 2 and 3). Fixed to axle 46 is a driving gear 48 (Fig. 2), a sprocket 50 equal in size and number of teeth to sprocket 40, and one end 52 of a helix torsion spring 54 (Fig. 3). Axle 46 is freely rotatable in bearing 42 of reel 20. The second end 56 of spring 54 is affixed to the structure of reel 20 by pin 58 extending transversely of reel 20 and extending into the side walls thereof, or by any suitable means of attachment.

The axle 38 for reel 22 and the axle 46 for reel 20 may be otherwise suitably supported as in bearing apertures in a casing. In Figures 1–4 inclusive a suitable casing is illustrated comprising a body member 60 having a top cover member 62 and a bottom cover member 64. Bottom cover 64 carries brush devices 32 and 34, the contacting device 14 and suitable terminals such as terminal 66 (Fig. 1) for electrical connection to the brush devices 32 and 34 and the electrical contact device 14. Bottom cover 64 may also have a bearing aperture 68 to receive one end of axle 46 and bearing aperture 70 to receive one end of axle 38.

Top cover 62 may carry suitable bearing apertures for the opposite ends of axles 38 and 46 and also a mechanism for rotating gear 48. This mechanism may include a gear 72 fixed to a shaft 74 to which a knob 76 is affixed. Rotation of knob 76 will revolve gear 48, sprocket 50 and axle 46. A chain 78 may be provided for extending about the sprockets 40 and 50 for driving same in unison.

A post 80 (Fig. 3) may extend between the bottom and top covers for providing surface 82 across which the member 12 and resistance element 10 may be trained. The body 60 of the casing is provided with a window 84 (Figs. 1 and 3) which serves generally as a locator means. Indicia such as printed numbers 86 (Fig. 1) may be placed on the member 12 and be visible through the window 84. Suitable markers such as indentations 88 may serve to provide accurate locator or positioning means whereby the instrument may be precisely set to a desired value.

The contact device has previously been described as including two contact points 16 and 18 which engage the resistance element 10. In the general case, only one contact point is necessary and this may be at any convenient place on the structure, so long as the "stagger" distance from the contact point to the locator means is accounted for in placing the indicia on the member 12. Use of two contact points such as 16 and 18, however, permits the indicia to appear directly opposite the corresponding resistance value point of the element 10 and at the same time, it is not necessary for one or the other of the junction points 30 at the ends of the member 12 and element 10 to pass before the window 84.

The body 60 and top and bottom covers 64 may be secured together by any suitable means, such as passing screw-threaded members through apertures 90.

The purpose of spring 54 (Fig. 3) is to maintain tension on the element 10 and member 12 and at the same time compensate for differing angular movements of the reels 20 and 22 as the element 10 and member 12 are reeled from one reel to the other, the axles 38 and 46 being caused to move at the same angular rate by virtue of the sprockets 40 and 50 and the chain 78.

From the foregoing detailed description of a preferred specific embodiment, the general nature of the invention will now be well understood. No limitation to the specific embodiment is intended. The general function of the device is that means is provided for continuously relating the position of a contact means to the progressive resistance values of a resistance element, with the position of particular indicia on the indicia carrying member relative to the locator means.

The manner of attaching a resistance element to an indicia carrying member may take many forms within the scope of the present invention and no limitation is intended. As examples, in Figure 8 resistance element 10a is sandwiched between layers 12a and 12b of a tape which has been folded over at 12c. Again, it will be understood that the indicia carrying member may be of any material so long as some insulation is provided so as to prevent short-circuiting of the resistance element along the length thereof, leaving a protruding area for electrical contact. Figure 9 shows a resistance element 10b in the form of a narrow strip affixed to one side of indicia carrying member 12d. Figure 10 shows a broad resistance element 10c affixed to one side of a broad indicia carrying member 12e. Figure 11 shows a resistance element in the form of a narrow strip 10d inserted into a slot in the edge of indicia carrying member 12f. Figure 12 shows a resistive element in the form of electrically conductive particles 10e impregnated in an edge of indicia carrying member 12g. Figure 13 shows three parallel resistance elements 10f affixed to grooves in one side of indicia carrying member 12h. Figure 14 shows parallel resistance element 10g in grooves in each side of indicia carrying member 12i.

Figure 15 shows an indicia carrying member 12j having a resistance element 10h in the form of a helix wound about a wire 10h' of insulating material. Figure 16 shows a resistance element 10i wound as a flat helix about a first tape 10i' which when assembled is to be affixed to the under side of indicia carrying member 12k. It will be understood that the provision of a helix as in Figures 15 and 16, with provision for the contact member 14 touching the convolutions of the helix along one edge thereof, increases the effective length of the resistance element.

In regard to the various constructions of Figures 8–16, it will be understood that the contact member 14 as shown in the embodiment of Figures 1–7, may be varied to accommodate the particular construction of the member 12 and element 10 so as to make proper contact.

Figure 17 shows diagrammatically how reels 20 and 22, here designated 20' and 22', may be located side by side in suitable housing structure with an axis common thereto and with provision for differential movement as by a spring similar to spring 54 (Fig. 3) for moving a combined indicia carrying member and resistive element. This showing serves to emphasize the variety of forms which the actual construction may take without necessary limitation to any particular designs.

Figure 18:
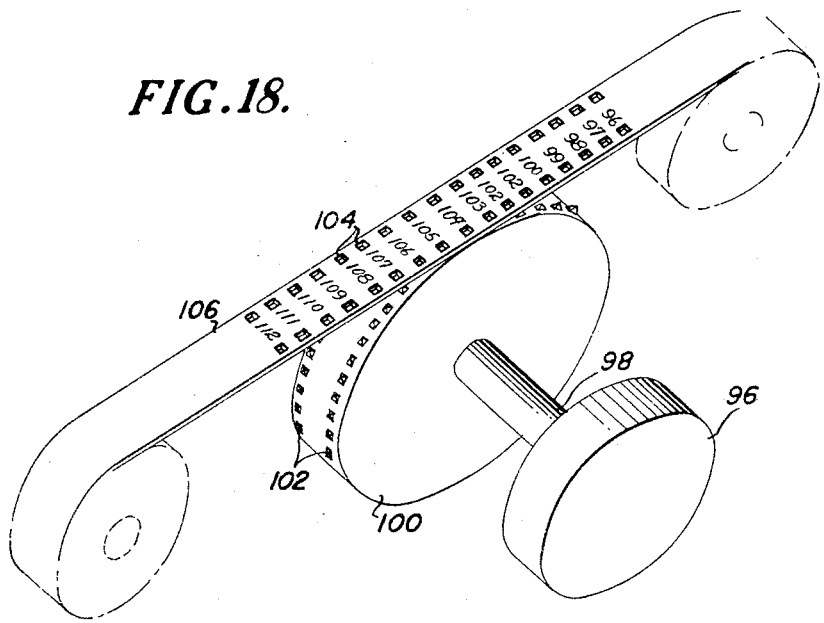
Figure 18 shows an embodiment of the invention coupling an indicia carrying member to a conventional slide wire potentiometer.

In scope the present invention embraces the provision of other arrangements for continuously relating the position of the contact means relative to the resistance element with the position of the indicia carrying member relative to the locator means. In Figure 18 a conventional multi-turn potentiometer 96 may have affixed to shaft 98 thereof a wheel 100 having sprocket teeth 102 therein for engaging sprocket holes 104 in an indicia carrying member 106. It will be understood that member 106 may have a resistive element affixed thereto in keeping with the invention as described hereinabove. Suitable locator means (not shown in Fig. 18) may be provided for positioning the various indicia, the indicia having been placed on the member 106 in accordance with measured values of resistance in the potentiometer 96.

Figure 19:
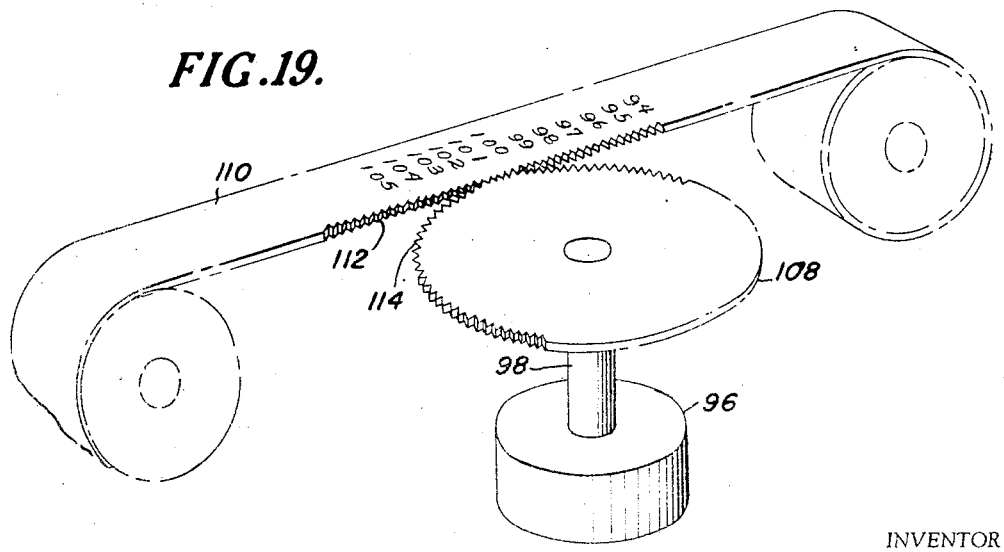
Figure 19 shows a further embodiment of a conventional potentiometer coupled with an indicia carrying member in accordance with the invention.

Figure 19 shows another form of application of the invention to a standard potentiometer 96 having shaft 98. In this embodiment a gear 108 is affixed to shaft 98, and an indicia carrying member 110 is provided with teeth 112 for engaging teeth 114 on gear 108. Again, it will be understood that a resistive element may be affixed to the indicia carrying member 110, with the inclusion of suitable insulating material between the resistance element and the member 110, or having the member of insulating material, for preventing short-circuiting of the resistance element.

It will be understood that while the indicia may be placed on the indicia carrying member before the apparatus is assembled, as by connecting the resistance element in a suitable calibrating circuit, it will be preferable in most instances to place the indicia after the instrument is assembled, so that the character of the resistance of brush devices 32 and 34 and the contact device 14 may be accounted for.

It will be understood that in constructing the reels 20 and 22, the post 80 and any other parts which may be in proximity to the resistance element 10, electrically insulating material should be employed or other precaution taken to avoid short-circuiting sections of the resistive element. In all cases, the resistive element when reeled up with the indicia member will result in a separation of the electrically exposed areas of the element so that there will be no short-circuiting of the element. For example, with a bare wire in a groove at the edge of the indicia tape (Figs. 6 and 7), the thickness of the member 12 should be slightly greater than the diameter of the element.

Figure 20:
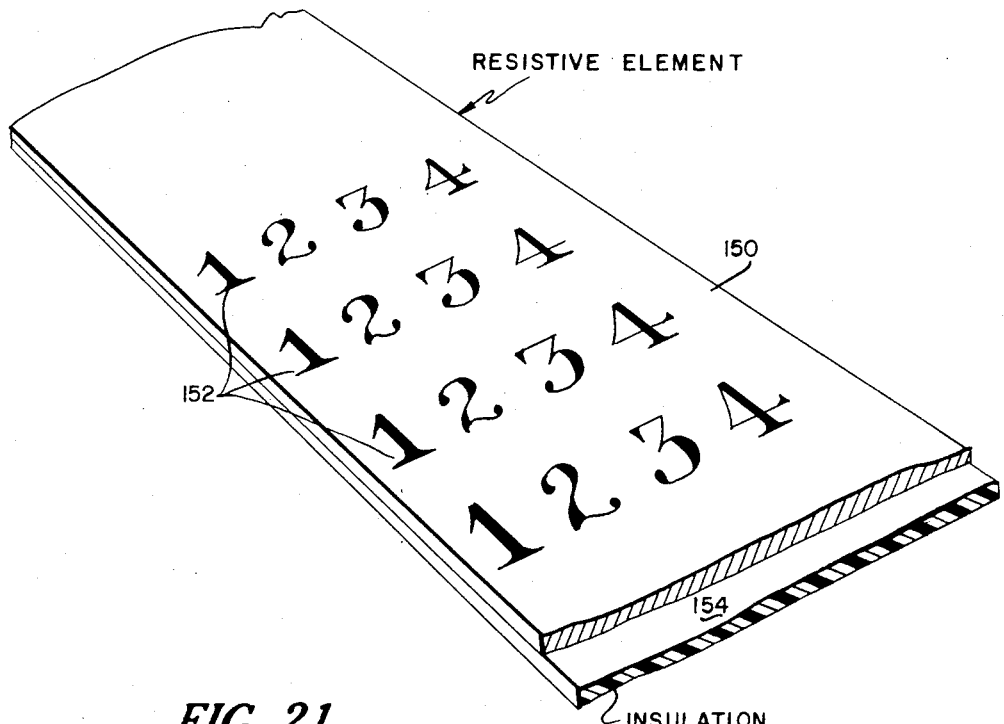
Figure 20 shows a further embodiment of the invention, wherein indicia are placed directly on the respective element.

The specific embodiments of the invention above described contemplate a resistance element coupled from point to point therealong to a member upon which the indicia is to be placed. However, and as a further embodiment of the invention, the resistance element may itself be of such size as to permit the indicia to be placed thereon. This is illustrated in Figure 20, 150 being an electrically conductive element in the form of a tape, with indicia 152 placed thereon as by stamping, printing or any convenient means. 154 is a strip of insulating material for preventing shorting of convolutions of element 152 on a spool. The insulating material may be fixed to the element 150, by spraying a settable material thereon, or cementing or otherwise affixing a preformed strip thereto.

The strip 154 need not be the width of element 150, so long as it serves the purpose of preventing convolutions of element 150 from shorting on themselves.

Figure 21:
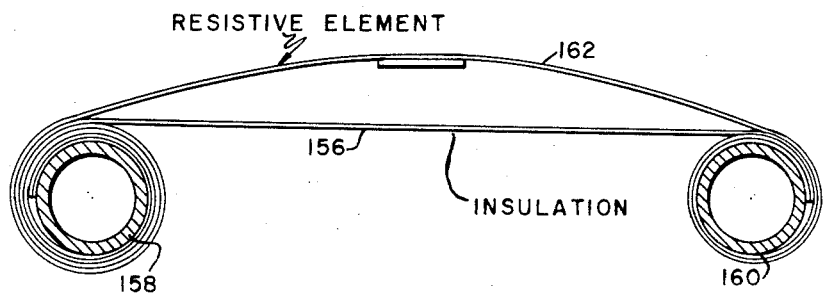
Figure 21 shows a further embodiment of the invention wherein an insulating member free of the resistive element is reeled up therewith.

When the indicia appears directly on the resistive element, the insulating strip need not be attached to the elemen, as will be understood. For example, Figure 21 illustrates a case where the insulating strip 156 is only wound up on the reels 158 and 160 and is otherwise free of the resistive element 162 which carries indicia. The basic requirement of the invention is still satisfied, however, that the indicia, placed in terms of actual electrical measurement rather than more lengthwise measurement, are locked with the resistive element for movement therewith.

The foregoing detailed descriptions have been given for purposes of illustration only and the true scope of the invention is to be determined from the appended claims.

What is claimed is:

1. In an adjustable resistance device of the type having an elongated resistance element and contact means relatively movable with respect thereto, means for moving the contact means relative to the element, a member having indicia thereon for providing resistance value information, locator means for determining a reading point on said indicia carrying member, and means for continuously relating the position of the contact means relative to the resistance element with the position of the indicia carrying member relative to the locator means, the indicia being progressively placed on the member to conform to progressively electrically determined values of resistance of the element.

2. A device as in claim 1 wherein the means for relating the position of the contact means and resistance element with the position of the indicia carrying member and the locator means comprises a fixed binding means between the indicia carrying member and the resistance element.

3. A device as in claim 1 wherein the indicia member is a tape having said indicia thereon and wherein the element is affixed to at least one edge of the tape.

4. A device as in claim 3 wherein the element is a round wire affixed in a groove along the edge of the tape.

5. A device as in claim 3 wherein the element is a narrow strip of electrically conductive material inserted into a groove in one edge of the tape.

6. A device as in claim 1 wherein the indicia member is a tape having said indicia thereon and wherein the element is a tape of electrically conductive material sandwiched between portions of the indicia tape.

7. A device as in claim 1 wherein the indicia member is a tape having the indicia thereon and wherein the element is a strip of electrically conductive material affixed to one side of the tape and centrally thereof.

8. A device as in claim 1 wherein the indicia member is a tape having said indicia thereon and wherein the element is a tape of electrically conductive material affixed to one side of the locator means tape and slightly wider than the indicia tape.

9. A device as in claim 1 wherein the indicia member is a tape of insulating material and the element is in the form of a chain of particles of electrically conductive material impregnated into a strip along the tape.

10. A device as in claim 9 wherein the particles forming the element are embedded along one edge of the tape.

11. A device as in claim 1 wherein the member is a tape of electrical insulating material and wherein the element comprises at least one elongated wire affixed in a groove in one side of the tape.

12. A device as in claim 1 wherein the member is a tape and the element is a helix of electrically conductive material having a diameter substantially the thickness of the member and affixed to the member lengthwise thereof.

13. A device as in claim 12 wherein the helix is affixed to one edge of the member.

14. A device as in claim 1 wherein the member is a first tape and wherein the resistance element is wound as a flat helix about a second tape, the second tape with the helix wound thereabout being affixed to said first tape on one side of the latter.

15. A device as in claim 1 wherein the means for relating the position of the contact means and resistance element with the position of the indicia carrying member and the locator means includes means coupling the indicia carrying member to the resistance element for related movement of the member and element.

16. A device as in claim 15 wherein the coupling means includes sprocket perforations in the indicia carrying element, a sprocket wheel in engagement therewith, and means connecting the sprocket wheel with the resistance element.

17. A device as in claim 15 wherein the coupling means includes teeth in an edge of the indicia carrying member, a gear for engaging with the teeth of the member for rotation as a rack and gear combination, and means connecting the gear to the resistance element.

18. A device as in claim 1 wherein the means for moving the contact means relative to the element includes two reels for winding of the element thereon and transfer therebetween by rotation of the reels, means for directly driving one reel in rotation, means for attaching the first end of the element to one reel and the second end of the element to the other reel, a torsion spring having one end connected to one reel, the second end of the torsion spring being linked to said direct means for rotation in synchronism with the direct drive means, the arrangement being such that the torsion spring maintains the element under tension and accommodates differences in the rotation of the respective reels as the amount of the element on one reel diminishes or increases with respect to the other during the transfer of the element from one reel to the other.

19. A device as in claim 18 wherein the indicia carrying member is a tape having the resistance element affixed thereto.

20. A device as in claim 1 wherein the member and the element are fixed together and the contact means includes a point of contact with the member adjacent to each side of the locator means in the direction of movement of the element and member.

21. A device as in claim 1 wherein the element is affixed to the member, a casing, spaced reels for carrying the element and member, the locator means including a window in the casing, means to guide the element past the window, the contact means being mounted on the casing in contact with the element, the indicia being placed on the indicia member in conformity with the measured resistance value of the element at the contact point when the corresponding indicia is in the window.

22. In an adjustable resistance device of the type having an elongated resistance element and contact means relatively movable with respect thereto, a casing, the contact means being mounted on the casing, a first reel and a second reel rotatably mounted in the casing, means for directly rotating one reel, a torsion spring having first and second ends, means connecting the direct drive means to one end of the spring, means connecting the other end of the spring to the other reel, the resistance element having one end fixed to one reel and the other end to the other reel, brush means on the casing, collector ring members on each reel in engagement with a brush means, the ends of the resistive element being electrically connected to the collector ring members of each reel, and means for guiding the element into engagement with said contact means.

23. A device as in claim 22 and further including an indicia carrying member fixed to the resistance element and reeled on said reels, locator means on the casing in proximity to the path of the indicia member between the reels, the arrangement being such that the position of the contact means on the resistance element is continuously related to the position of indicia on the member with respect to said locator means.

24. An elongated member having an area with resistance indicating indicia thereon and having an elongated electrically conductive element affixed thereto along the length of the member.

25. In an adjustable resistance device of the type having an elongated resistance element and contact means relatively movable with respect thereto, means for moving the contact means relative to the element, indicia associated with the element from point to point therealong in terms of actual electrical determination of resistance of the element and movable with the element in response to operation of said moving means, and locator means for determining a point for reading the indicia for each position of the element relative to the contact means.

26. A device as in claim 25 wherein the indicia is associated with the element by being placed directly thereon.

27. A device as in claim 25 and further including a member attached to the element from point to point therealong, and wherein the indicia is associated with the element by placement on said member.

28. An elongated electrically conductive element having indicia placed thereon from point to point therealong, the respective indicia being representative in predetermined manner of the resistance of the element and placed on the element in terms of actual electrical determination of resistance of the element.

References Cited in the file of this patent

UNITED STATES PATENTS

| | | |
|---|---|---|
| 1,564,157 | Wainwright | Dec. 1, 1925 |
| 1,704,153 | Stockle | Mar. 5, 1929 |
| 1,999,871 | Drabin | Apr. 30, 1935 |
| 2,487,064 | Marsh | Nov. 8, 1949 |

FOREIGN PATENTS

| | | |
|---|---|---|
| 38,943 | Germany | Sept. 28, 1896 |
| 516,852 | Great Britain | Jan. 12, 1940 |